United States Patent
Holden

(10) Patent No.: US 6,883,467 B2
(45) Date of Patent: Apr. 26, 2005

(54) NARROWBOAT AUXILIARY HEATER AND METHOD OF CONTROLLING SAME

(75) Inventor: Clement James Holden, Southam (GB)

(73) Assignee: International Thermal Investments Ltd., Richmond (CA)

( * ) Notice: Subject to any disclaimer, the term of this patent is extended or adjusted under 35 U.S.C. 154(b) by 0 days.

(21) Appl. No.: 10/350,310

(22) Filed: Jan. 22, 2003

(65) Prior Publication Data

US 2004/0142295 A1 Jul. 22, 2004

(51) Int. Cl.$^7$ ................................................. F24D 3/12
(52) U.S. Cl. ............................ 122/3; 237/8 A; 237/28
(58) Field of Search .................... 237/19, 28, 8 A, 237/8 D, 9 A; 122/3, 36, 40, 15.1, 14.1, 13.01; 126/368.1; 432/220, 222, 223

(56) References Cited

U.S. PATENT DOCUMENTS

| | | | | |
|---|---|---|---|---|
| 4,360,003 A | * | 11/1982 | Hardy | ................ 126/367.1 |
| 5,059,287 A | * | 10/1991 | Harkey, Sr. | ................ 203/1 |
| 5,544,645 A | * | 8/1996 | Armijo et al. | ................ 126/101 |
| 6,167,845 B1 | * | 1/2001 | Decker, Sr. | ................ 122/40 |
| 6,283,067 B1 | * | 9/2001 | Akkala | ................ 122/14.22 |
| 6,612,504 B1 | * | 9/2003 | Sendzik | ................ 237/12.3 B |

OTHER PUBLICATIONS

Brochure entitled *"Marine Heating Systems From Espar"*. Date unknown, but at least as early as Jan. 2003.

* cited by examiner

*Primary Examiner*—Gregory Wilson
(74) *Attorney, Agent, or Firm*—John Russell Uren

(57) ABSTRACT

A hot water system for a narrowboat which system comprises an auxiliary heater used to heat a potable water tank and further is used to heat living areas of the narrowboat. The auxiliary heater and a temperature measuring device are operably connected to the water tank which terminates operation of the heater when the temperature reaches a predetermined and comfortable level selected by the user. Likewise, a room water circuit is operably attached to the auxiliary heater and is operated by a thermostatically controlled solenoid valve which terminates hot water flow through a radiator within the living areas when the temperature reaches a value selected by the user.

2 Claims, 1 Drawing Sheet

NARROWBOAT AUXILIARY HEATER AND METHOD OF CONTROLLING SAME

This invention relates to marine heaters and, more particularly, to the use and control of marine heaters used in narrowboats, also known as canal boats.

BACKGROUND OF THE INVENTION

The use of heaters to heat water in narrowboats, which water is used for both potable and zone heating purposes is, of course, well known. Typically, the known installation consists of an auxiliary heater which uses diesel fuel similar or the same as that used by the prime mover or engine used to power the narrowboat. The auxiliary heater includes a burner which heats water circulating through the heater within a water jacket. The heated water is then circulated through a potable water tank where heat exchange takes place to heat the potable water within the tank. The heated potable water within the water tank is then used for potable purposes such as washing and cooking.

In addition to the heating of the potable water within the hot water tank by the auxiliary heater, the water is also heated by a hot water circuit emanating from the diesel engine used to power the narrowboat. In the event that the diesel motor is not operating, then the auxiliary heater may be used alone. When the diesel engine is operating, the auxiliary heater may be manually shut down thereby conserving energy and reducing operating noise.

The known system also uses a water circuit running from the auxiliary heater to heating zones of living space on the narrowboat. These zones are heated typically using a radiator type heater. Water from the auxiliary heater is circulated through the heater and this heater then heats the zones. When the temperature of the zone reaches a comfortable value, the operation of the auxiliary heater is then terminated by way of a manual shut off valve and, thereafter, flow is similarly initiated.

There are inherent disadvantages with the systems presently in use and described above. First, there is no provision for obtaining potable water from the heated water tank at a preferred temperature. The temperature of the potable water within the tank is heated by the auxiliary and/or the engine water circuit and there is no control over the temperature of the water to be used for potable purposes. The only control of the water temperature is that if the water in the auxiliary heater becomes too hot, the auxiliary heater will terminate operation. If the temperature of the water in the cooling circuit of the prime mover becomes too hot, there likewise is a fail-safe provision to shut down the engine. But these controls are independent of the water temperature within the potable water tank.

A second disadvantage of the present system is that there is likewise little or no automatic control over the temperature of a zone within the narrowboat which zone is heated by water circulating from the auxiliary heater. In the event the zone temperature becomes too hot, a manual valve is used to terminate and initiate hot water flow through a radiator in the zone of interest.

A third disadvantage of the present system is that there is no provision for automatically shutting off the auxiliary heater when the diesel engine used to power the narrowboat is also operating. Thus, both the auxiliary heater and the diesel engine are being used to heat the potable water and there may be no need to do so if the potable water has reached its desired temperature. This is inefficient and costly and it produces unnecessary noise.

Yet a further disadvantage of the present system relates to the air intake and exhaust outlet associated with the auxiliary heater. The exhaust outlet and the air intake are typically incorporated in a single fitting which fitting was mounted on the side of the narrowboat. The heater exhaust exited from the center of the fitting with inlet air for the heater being inletted about the outer area of the fitting surrounding the inlet. Normally, this is sufficient to avoid contamination of the inlet air. However, narrowboats are often moored next to the wall of a canal or next to a second and adjacent narrowboat. It has been found that the oxygen depleted exhaust from the engine was being inhaled into the engine through the air intake in the fitting. The lack of oxygen resulted in a weak or non-existent combustion of fuel by the burner which resulted in flame outs and inefficient oxygen and air use by the auxiliary heater.

SUMMARY OF THE INVENTION

According to one aspect of the invention, there is provided a hot water heating system for a narrowboat comprising a water tank containing water heated by at least two hot water circuits, and a thermostat to measure the temperature of water in said water tank and to terminate operation of one of said water circuits when the temperature of said water exceeds a predetermined value and to initiate operation of maid one of maid circuits when maid temperature of maid water is below a lower limit.

According to a further aspect of the invention, there is provided a hot water heating system for a narrowboat comprising a heater water circuit extending from a source of heat to a water tank, a room water circuit connected to and extending from said heater water circuit and wherein a thermostatically controlled valve initiates water circulation from said room water circuit through a radiator when said temperature of said room is below a first predetermined value and which thermostatically controlled valve terminates operation of said room water circuit when said temperature of said room is above a second predetermined value.

According to yet a further aspect of the invention, there is provided an exhaust system for an auxiliary heater used in a hot water heating system used in a narrowboat wherein fresh ambient air is provided to said burner from an inlet exposed to ambient conditions and wherein combusted air is exhausted from said burner through an outlet exposed to said ambient conditions, said inlet for said fresh ambient air being located a distance from said outlet whereby the quantity of fresh air provided to said burner through said inlet is uncontaminated by said combusted air exhausted from said outlet.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
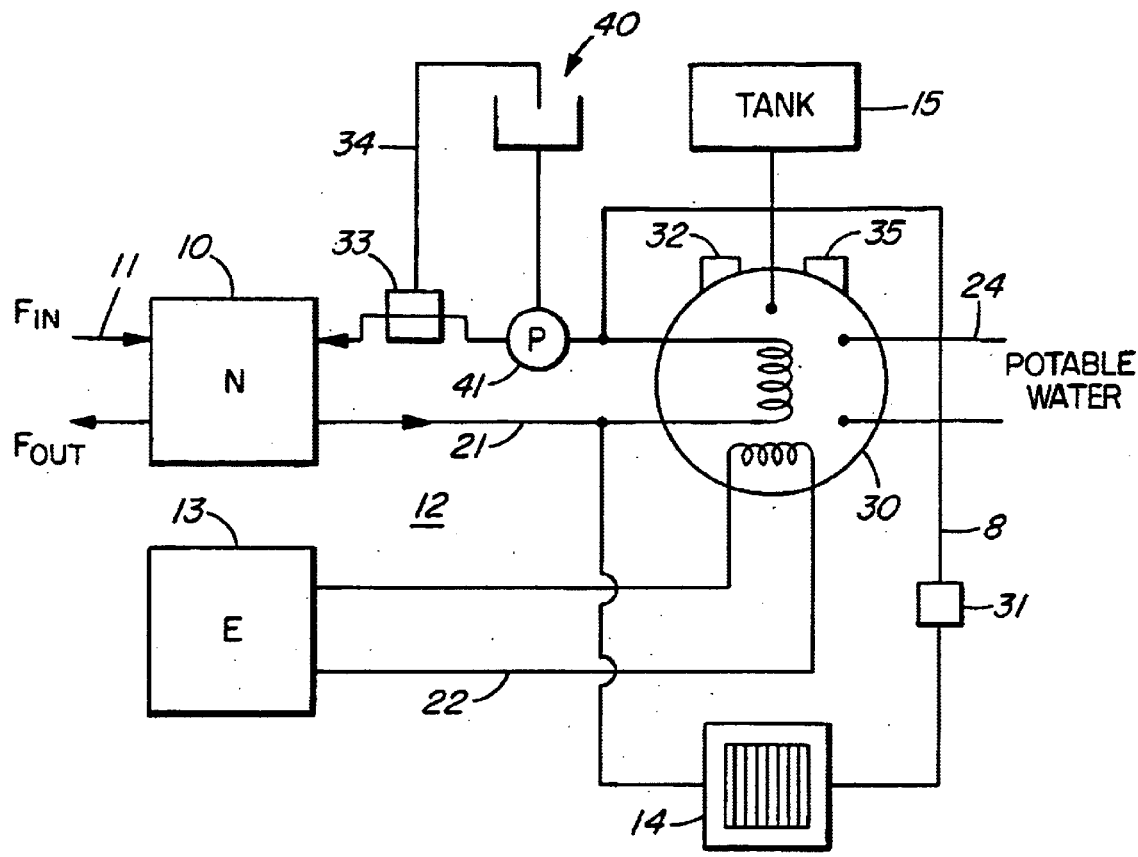
FIG. 1 is a schematic circuit diagram illustrating the water circuit of the narrowboat according to the present invention.
Figure 2:
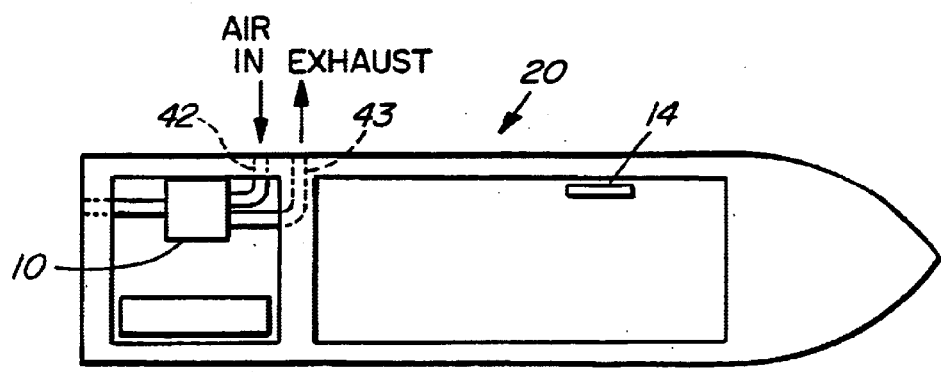
FIG. 2 is a diagrammatic and partial plan view of the narrowboat particularly illustrating the narrowboat with the air inlet and exhaust outlet locations of the auxiliary heater.

Referring now to the drawings, a hot water heating system is shown generally at 12 in FIG. 1 for a narrowboat or canalboat which is shown generally at 20 in FIG. 2. The hot water heating system 12 includes a plurality of principal components, namely a diesel powered burner or auxiliary heater 10 used to heat water, such auxiliary heater conveniently being a heater sold under the trademark HURRICANE, the engine 13 of the narrowboat which engine 13 is also diesel powered and which also produces hot water during operation, a water tank 30 containing potable water for use in cooking and personal consumption and a radiator 14, only one of which is shown, which radiator 14 is used for heating a living area of the narrowboat 20.

There are four (4) principal hot water circuits used in narrowboat 20, namely first, second and third circuits 21, 22, 23, respectively, and a potable water circuit 24. First circuit 21 is the circuit which emanates from and returns to the auxiliary burner or heater 10 and which circuit is used to heat the potable water in both water tank 30 and to heat the radiator 14. Second circuit 22 emanates from and returns to the engine 13 and is likewise used to heat the potable water within water tank 30. Third circuit 23 is used for heating the narrowboat living areas through a radiator 14 and is operably connected to first circuit 21. The potable water circuit 24 emanates from and returns to the hot water tank 30. This circuit contains the potable water used for washing, bathing, cooking and the like as is known.

A solenoid and thermostat valve combination 31 are operably positioned in third water circuit 23. When the thermostat 31 indicates the temperature within the living area has dropped below a predetermined level, the thermostat 31 will activate the solenoid to open the value and allow hot water to flow through the circuit to the radiator 14. When the thermostat 31 indicates a living area temperature over a predetermined level which value, of course, may be set by a user, the thermostat 31 activates the solenoid to close the value and terminate fluid flow through circuit 23. It will be noted that in this event and although hot water will not now be flowing through the radiator 14, hot water from the auxiliary heater 10 will continue to heat the potable water tank 30 if needed.

A second thermostat 32 is operably connected to the potable water tank 30 and to the auxiliary heater 10. This thermostat 32 senses the temperature of the water within the water tank 30 and may be manually adjusted by the user. If the setting of the thermostat 32 is exceeded, the auxiliary heater 10 will terminate operation. This scenario is envisioned when the diesel engine 13 may be running and the water is adequately heated by the engine 13 without the necessity of the additional heat provided by the auxiliary burner 10. The thermostat 32 may also have a lower temperature value allowing the auxiliary heater 10 to again commence operation when the lower temperature is reached. Such a thermostat may keep the water with the tank 30 at a comfortable level for the user when the auxiliary heater 10 is the only water heater being used, for example. A pressure relief valve 35 is mounted on the hot water tank 30 to ensure pressure relief if necessary and a water tank 15 supplies a continuous supply of potable water to the hot water tank 30.

Referring again to first water circuit 21, a separator valve 33 is positioned within the circuit 21 to allow air to bleed form the water circuit 21. Air is vented from the separation valve through air line 34 which travels to a header tank generally shown at 40 and located a minimum distance above the air separator 33. A plump 41 provides pressure to move the water form the auxiliary heater 10 through the first and third circuits 21, 24, respectively.

Reference is now made to FIG. 2 wherein the auxiliary heater 10 is shown mounted in the rear of the canal boat 20.

Air used for combustion within the auxiliary heater 10 enters the auxiliary heater 10 through an air inlet 42 which is located an appropriate distance from the exhaust outlet 43. The auxiliary heater 10 according to the invention utilises a closed air system that only takes air in from the ambient surroundings through the air inlet 42 which extends through a closed duct to the heater 10. Accordingly, it is important that the inletted air be uncontaminated by the oxygen depleted exhaust from the auxiliary heater 10 which exits from exhaust outlet 43. Because narrowboats are often moored next to the walls of a canal or next to an adjacent narrowboat, there may be backpressure allowing some of the exhaust to be drawn into the air inlet 42. The air inlet 42 is therefore separated from the exhaust outlet a distance sufficient to prevent such contamination. Of course, different placements could conveniently be made as well, such as having the air inlet 42 on the rear or transom of the narrowboat 10 and leaving the exhaust outlet 43 on the side of the narrowboat 10 as is shown.

OPERATION

In operation, either or both the auxiliary heater 10 or the engine 13 may be operated to initiate and maintain the heating of the potable water within the hot water tank 30. The auxiliary heater 10 will be operated if it is desired to heat the radiator 14. Fuel lines 11 provide fuel, conveniently diesel, to heater 10 and pump 41 commences operation to move the water through first circuit 21 and, if the thermostat 31 in third circuit 23 indicates a room temperature below that desired, to open valve 31 and move the heated water through third circuit 23 thereby to heat the radiator 14.

Typically, if the narrowboat 20 is moored, the auxiliary heater 10 is the only source of hot water used to heat the water tank 30 and to heat the radiator 14. However, if the narrowboat 20 is underway with the engine 13 under operation, the water tank 30 will also be receiving heater water from the engine or second circuit 22.

Thermostat 32 is operably connected to potable water tank 30 and auxiliary heater 10 and in the event the water in the tank 30 reaches its desired temperature and the room temperature as indicated by thermostat 31 is at its desired comfort level, the operation of auxiliary heater 10 will be terminated. Only the engine 13 will still be supplying heated water to the water tank 30. If thermostat 31 indicates a temperature within the living areas of less than that desired or if the temperature of the water within water tank 30 is lower than that tolerance built into thermostat 32, the operation of the auxiliary heater will again commence.

As the water travels through circuit 21, air will be separated from the water and bled off to atmosphere by separator valve 33 through header tank 40 and the exhaust outlet 43 and air intake 42 will provide uncontaminated ambient air to the auxiliary heater 10 by reason of their separation on the side of the narrowboat 20.

Many further embodiments will readily occur to those skilled in the art to which the invention relates and the specific embodiment herein described should be taken as illustrative of the invention only and not as limiting is scope as defined in accordance with the accompanying claims.

I claim:

1. A hot water heating system for a narrowboat comprising a water tank containing water heated by at least two hot water circuits, each of said respective hot water circuits using heated water within said respective circuit to heat said water in said water tank and a thermostat to measure the temperature of water in said water tank and to terminate operation of one of said hot water circuits when the temperature of said water in said water tank exceeds a predetermined value and to initiate operation of said one of said circuits when said temperature of said water in said water tank is below a lower limit.

2. A hot water heating system for a narrowboat comprising a heater water circuit extending from a source of heat to a water tank, a room water circuit connected to and extending from said heater water circuit and wherein a thermostatically controlled valve initiates water circulation from said room water circuit through a radiator when said temperature of said room is below a first predetermined value and which thermostatically controlled valve terminates operation of said room water circuit when said temperature of said room is above a second predetermined value.

* * * * *